3,265,803
FLEXIBLE ELECTRICAL CABLE

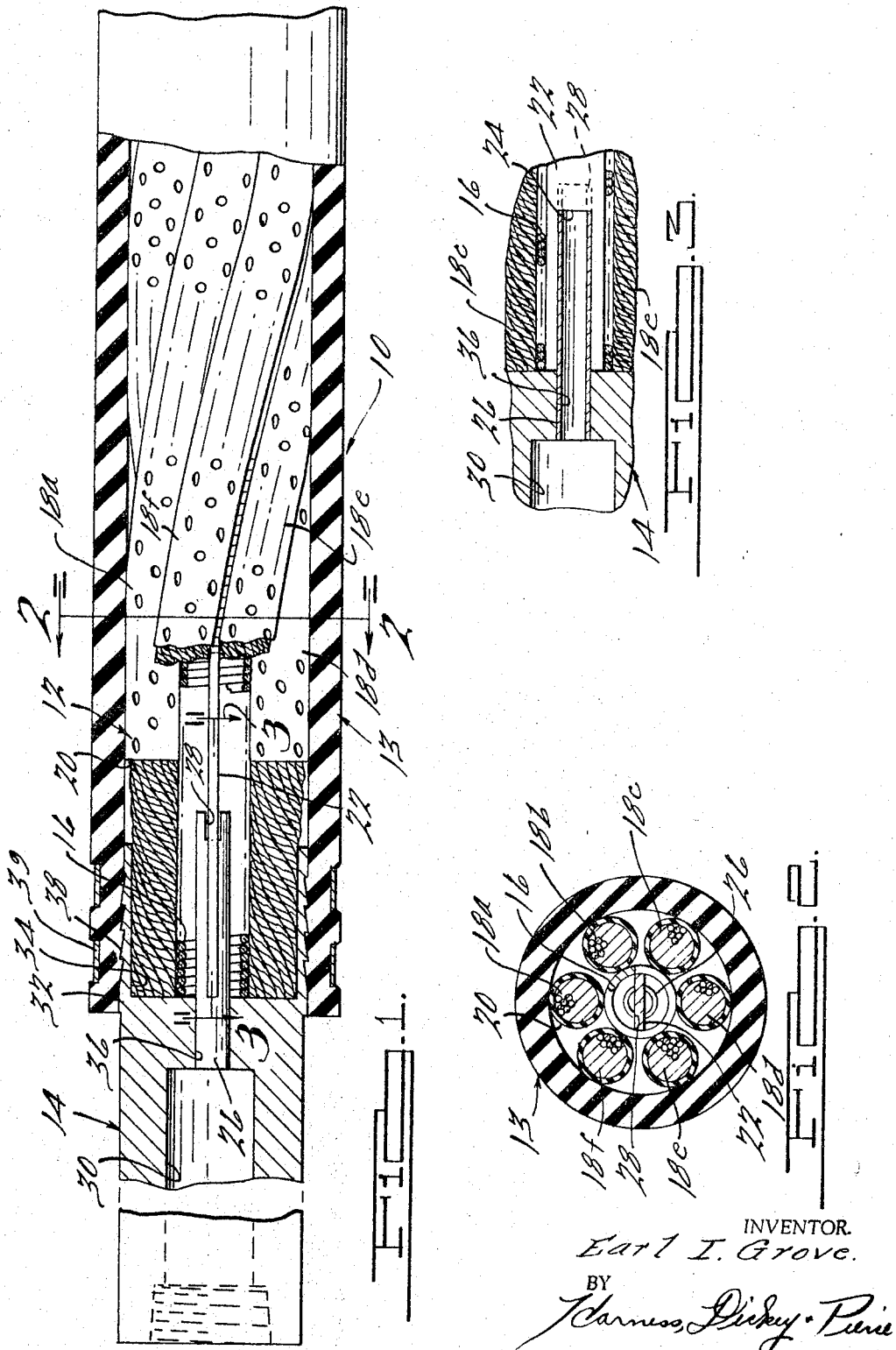

Earl I. Grove, Walled Lake, Mich., assignor to Gar Wood Industries, Incorporated, Wayne, Mich., a corporation of Michigan
Filed Jan. 14, 1964, Ser. No. 337,602
3 Claims. (Cl. 174—15)

This invention relates to electric cables and more specifically to flexible cables for carrying current having a high magnitude.

The flexible cable of the present invention is generally of that type shown and described in the U.S. Patent to M. Eaton, No. 2,759,988, issued August 21, 1956. In this type of cable a flat strip of resilient metal is located internally and extends longitudinally for the length of the cable. With such a construction the cable is flexible in a longitudinal plane perpendicular to the width of the strip and relatively rigid in a plane transverse thereto; thus a flexible cable of this type when fixed at its opposite ends can readily be longitudinally curved and flexed in one plane but strongly resists bending in a lateral direction. Such a cable may, if desired, be arranged in an arch and will maintain itself in such arched state while permitting movement of the connected parts in the plane of the arch.

Cables of this type are useful in heavy current applications where inherent flexibility is required in order to permit relative movement of the electrically connected apparatus; yet lateral bending due to inductive forces or other undesired bending effects is resisted by the cable itself. An important use of such cables is in electric furnaces in which the flexible cable is fixed at one end to a bus bar feeding the furnace and at the other end to a movable furnace electrode, and the flexible self-supporting cable is arched vertically upwardly between its two ends. Hence the end attached to the electrode can be moved vertically with the electrode and the change in distance between the bus bar and electrode is compensated for by flexure of such extra length of cable in the arch. By forming the cable in an arch upwardly from the furnace adequate vertical clearance is provided for the operation of the furnace and the cable is subjected to a minimum amount of radiant heat. It is still required, however, that the cable be water cooled for some applications. As noted in the patent to Eaton, supra, the installation of such a cable of the controlled flexibility type as an upstanding arch, as contrasted to a suspended catenary type of installation, also results in a shorter electrical circuit and a consequent reduction in resistive and reactive losses.

In the flexible cable of the patent to Eaton, supra, the resilient strip is embedded in a solid core of elastic material which is located centrally within the cable; the cable has a flexible, stranded conductor located circumferentially about and in engagement with the solid core. A flexible tube or hose encloses the conductor, and is oversized, so that its wall is radially outspaced from the conductor to define a passage for the flow of cooling fluid. With such construction the cooling fluid only flows through the annular space between the outer periphery of the conductor and the flexible tube. In the cable of the present invention, coolant is free to flow entirely around all of the several conductor portions, and through the central as well as the peripheral portions of the assembly, thereby improving the cooling of the cable and at the same time reducing its size and cost. Therefore, it is an object of this invention to provide an improved flexible cable of the above described type having improved cooling characteristics. It is another object of this invention to provide a cable of the indicated type in which the flow of fluid in the center of the cable is substantially uninhibited. Because of the improved cooling, the conductors of a cable constructed in accordance with the present invention can be of a smaller cross-sectional area for a given application as compared to prior cable constructions having less effective cooling thereby effecting still further reduction of size and cost, and enhanced flexibility in the desired planes of bending.

In the flexible cable of the present invention, I preferably employ a single layer of circumferentially arranged, stranded rope conductors of relatively large diameter and which are formed of fine loosely stranded wire and which ropes are themselves not tightly packed so that voids exist between adjacent conductors through which coolant may readily circulate. Thus in the cable of the present invention the coolant can flow not only through the center of the cable but also around and even between the individual strands of the several conductor ropes. Further, due to these provisions for improved cooling and improved coolant circulation, the construction of the present invention permits use of a hose having an inside diameter just large enough to permit the hose to be slipped over the conductors.

The flexible cable of the present invention is constructed with the resilient strip located along the longitudinal axis of the cable and with a plurality of stranded rope conductors twisted helically about that axis. Thus, as the cable is arched or as the cable is flexed, i.e., as the electrode is moved, each of the conductors is flexed substantially the same amount. With this construction the flexible cable of the present invention is readily adaptable to different requirements for arching, flexing, etc. In a cable in which the conductors are not helically twisted but extend substantially parallel to the longitudinal axis of the cable, arching of the cable requires some of the conductors to assume a larger arc than others with the result that the individual strands of the conductors are subjected to considerable frictional rubbing against each other as the cable is flexed. A cable so constructed is less flexible and more subject to frictional deterioration than a cable having helically twisted conductors. In some instances it is required that cables having non-twisted conductors be preformed to a selected curvature with the conductors being of various lengths to compensate for the curvature for that particular application. With the cable of the present invention such preforming is not required and a single construction can be used for a variety of applications having different arching requirements.

Therefore, it is a further object of this invention to provide a self-supporting type cable which is highly flexible in the desired plane and in which frictional deterioration of the conductor strands is minimized.

It is another object of this invention to provide a flexible self-supporting type cable in which a single construction of the cable can be used in various applications having different arching requirements.

It is a further, general object of this invention to provide a flexible cable of the self-supporting type having an improved construction.

Other objects, features, and advantages of the present invention will become apparent from the subsequent description and the appended claims, taken in conjunction with the accompanying drawing, in which:

FIGURE 1 is a longitudinal elevational view, with some portions shown in section and others broken away, of one end of a welding cable assembly embodying a preferred form of the invention;

FIGURE 2 is a cross-sectional view taken substantially along the line 2—2 in FIGURE 1; and FIGURE 3 is a fragmentary, detailed, sectional, elevational view, with some portions shown broken away, of a part of the cable assembly of FIGURE 1 taken substantially along the line 3—3 in FIGURE 1.

Looking now to the drawing, a preferred embodiment of a cable assembly of this invention is generally indicated by the numeral 10 and includes a longitudinally extending flexible cable 12 which is located within an outer hose 13 and which is connected at its opposite ends to terminals such as copper terminal 14.

The cable 12 has a longitudinally extending, helically coiled brass spring 16 and a plurality of conductors 18a–18f which are circumferentially located in a single layer about the radially outer periphery of the spring 16. The coiled spring 16 has its coils closely wound with adjacent coils in contact with each other. In order to permit the cable 12 to be flexible and to be readily arched to various contours without unequally stressing the conductors 18a–18f, the conductors 18a–18f are made of a loosely stranded rope construction preferably composed of fine gauge copper wires and are helically wound about the spring 16 and hence about the longitudinal axis of the cable 12 so that regardless of the shape assumed by the cable 12 each of the conductors 18a–18f as well as their individual strands is substantially flexed the same amount (FIGURE 1). The conductors 18a–18f define a central opening or core space having a diameter substantially equal to the outside diameter of the spring 16. The spring 16 is stiff enough to resist collapse when the cable is bent and so supports the conductors 18a–18f that the cable 12 can be bent or flexed and the central opening or core space will substantially maintain its original size. Each of the conductors 18a–18f is disposed within a perforated tube such as tube 20 made of a flexible elastomer such as neoprene and which further enhances flexibility, protects the strands of each of the conductors 18a–18f from damage due to rubbing against the strands of adjacent conductors, and restrains displacement of any strand portions which might break after long service.

A flat, elongated stabilizer strip or bar 22, having a width substantially greater than its thickness, is located centrally within the spring 16. The bar 22 (FIGURE 3) is made of a resilient material such as Phosphor bronze and has a width substantially equal to the inside diameter of the spring 16 and has a rectangular open-ended slot or opening 24 at each end. Each opening 24 is of a width substantially equal to the outside diameter of a combined keying and coolant feed tube 26, which has a diametrical slot 28 at its cable end, such slot being shorter axially than slot 24, and wide enough to embrace the bar 22. It will be understood that although only one end of the cable is shown, the two ends would normally be alike. The tube 26 is of metal, and forms a part of a terminal structure which also may be alike at each end. The tube 26 is rigidly fixed in the terminal body and projects into opening 24, and the slotted end portion 28 of the tube 26 also extends over the unslotted portion of the bar 22 as shown in FIGURE 1. The tube 26 is soldered to the bar 22 along the various mating surfaces provided by the above-described construction resulting in a strong bond between these parts. It will be understood that the stiffening bar 22 is not twisted about its longitudinal axis and that the slotted keying portions of the two terminals, when the terminals are secured to their respective supports, hold the stiffening bar and the cable as a whole against such twisting.

The terminal 14 is generally cylindrical and has a bore 30 extending longitudinally inwardly from one end and an enlarged diameter portion 32 with an enlarged diameter opening 34 at its opposite end. A reduced diameter bore 36 substantially equal to the outside diameter of the keying tube 26 extends coaxially with and communicates between the bore 30 and the counterbore 34 whereby a passage is defined through the terminal 14. The combination keying and coolant feeding tube 26 is located and soldered in the small bore 38 with the end of the stabilizer bar 22 abutting the axial termination of the opening 34. The neoprene tubes such as tube 20 terminate short of the end of each of the conductors 18a–18f and the outside diameter at this end portion of the cable 12 is substantially equal to the diameter of the opening 34. The end portion of cable 12 is located and soldered within the opening 34 of the terminal 14. The opposite end of cable 12 is similarly connected to another terminal such as 14. An electrical circuit is provided between the terminals 14 both by the conductors 18a–18f and also by the stabilizer bar 22 via riser tubes 26.

The radially outer surface of the enlarged portion 32 of the terminal 14 is provided with a series of annular ridges and grooves such as 38. The outer hose 13 has an inside diameter substantially equal to the outside diameter of the cable 12 and of the enlarged portion 32 of each terminal 14 whereby the hose 13 can be slipped on or off the cable 12 and the terminals 14. When the cable assembly 10 is to be used in an electric furnace or other application having a high ambient temperature, the outer hose 13 will be of a suitable heat resistant construction, such as layers of asbestos impregnated with rubber. Each end of the hose 13 is clamped into sealing engagement with the ridges and grooves 38 on enlarged portion 32 by annularly extending binders or clamps such as clamp 39, thereby providing a fluid-tight connection between the hose 13 and the terminals 14.

The open end of the bore 30 of terminal 14 is threaded to receive a conventional pipe fitting (not shown) whereby the cable assembly can be connected to a source of water under pressure. The water flows from the source into one of the terminals 14 through its bore 30 and into the hose 13 through the associated riser tube 26; the water in the hose 13 is discharged through the other riser tube 26 to an outlet pipe or hose (not shown) connected at the bore 30 in the opposite terminal 14. The spring 16, while providing support for the conductors 18a–18f, permits the core of the cable 12 to be essentially hollow. With the construction as shown and described, the water circulates through the center of the cable 12 and passes between the individual coils of the spring 16 to circulate substantially completely about each of the conductors 18a–18f. Since the water, before contacting the conductors 18a–18f, must pass between the coils of the spring 16 and since adjacent coils are wound closely to each other, a filtering action is provided whereby foreign matter in the water entering the core of the cable assembly 10 is prevented from moving radially through the spring 16 and from contacting the individual conductors 18a–18f and is maintained in the core and expelled out the discharge end. Since the neoprene tubes 20 are perforated the water is in direct contact with and circulates in between the strands of the conductors 18a–18f. Note that by using a single layer of circumferentially arranged rope conductors 18a–18f having circular cross-sections of relatively large diameters rather than a construction having a plurality of tightly packed, multiple-layered conductors for example as shown in the patent to Eaton, supra, voids are present between conductors 18a–18f, providing additional passages for the water and thereby further improving the circulation of the water (FIGURE 2). With such complete circulation of water and its resultant improved cooling, the hose 13 can be of a minimum size having an inside diameter substantially the same as the outside diameter of the cable 12. In constructions having a solid core and tightly grouped multiple-layered and covered conductors located thereover, in order to provide space for the flow of water a hose having an inside diameter considerably larger than the outside diameter of the cable is used. With improved cooling as provided in the cable assembly 10, the conductors 18a–18f can be of a smaller total cross sectional area for a given current capacity than for a comparable cable assembly having less effective cooling. Thus a further cost savings is realized on the material for the conductors in addition to the saving in overall size and in the cost of the outer casing. The improved cooling also generally increases the life of the cable. The spring 16, being inherently resilient in directions perpendicular to its central axis, readily conforms to the contours imposed upon the cable assembly 10. Since the bar 22 is located within the spring 16, the conductors 18a–18f and their coverings 20 are very effectively protected by the spring 16, from being worn or damaged due to contact with the bar 22 under forces resulting from induction and bending of the cable. Thus spring 16 functions as a combined filtering device, support for maintaining the shape of the central core space, and separator for separating the conductors 18a-18f from the strip or bar 22.

In operation, the cable assembly 10 can be mounted with one terminal 14 rigidly mechanically attached and electrically connected to a bus bar and the opposite terminal 14 similarly attached and connected to a movable element such as a furnace electrode. If the cable assembly 10 is arched vertically upwardly to provide clearance for operation of the furnace and to provide sufficient extra cable length to permit the furnace electrode to be moved vertically, up or down, relative to the furnace, the cable assembly 10 is capable of supporting itself against gravity and induction-induced bending in transverse planes.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A flexible electrical cable assembly comprising a flexible electrical cable including a longitudinally extending coiled member, a flexible, elongated flat bar located within said coiled member, a hollow tube member extending partially within said coil member in clearance relationship therewith fixed to one end of said flat bar, and flexible electrical conductor means disposed circumferentially about said coiled member for conducting an electrical current; and a terminal member having a bore for matably and fixedly receiving a portion of said tube member and having means for fixedly receiving an end portion of said conductor means, and passage means in said terminal member in fluid communication with said tube member for defining a fluid passage through said terminal member and said tube member.

2. The cable assembly of claim 1 with said flexible electrical conductor means comprising a plurality of stranded rope conductors disposed circumferentially about and helically wound about said coiled member, said conductors being of a relatively large diameter and wound to define substantial voids between one another with said voids defining cooling passages.

3. The flexible electrical cable assembly of claim 2 further comprising a hose member disposed over said cable and fixed at one end to said terminal member for defining with said passage means and said tube member a fluid path through said cable assembly, said hose member being of an inside diameter just sufficient to slip over said cable.

References Cited by the Examiner

UNITED STATES PATENTS

| 2,759,988 | 8/1956 | Eaton | 174—28 |
| 2,946,837 | 7/1960 | Beamish | 174—15 |
| 2,985,708 | 5/1961 | Ross | 174—15 X |
| 3,079,460 | 2/1963 | Grove | 174—128 |
| 3,156,760 | 11/1964 | Grove | 174—15 |

FOREIGN PATENTS 552,769  2/1958  Canada.

LARAMIE E. ASKIN, *Primary Examiner.*

JOHN F. BURNS, ROBERT K. SCHAEFER, *Examiners.*

J. F. RUGGIERO, *Assistant Examiner.*